April 17, 1956    E. L. MACOICZ    2,742,557
CONTROLS FOR ELECTRIC OVENS
Filed Sept. 28, 1953    2 Sheets-Sheet 1
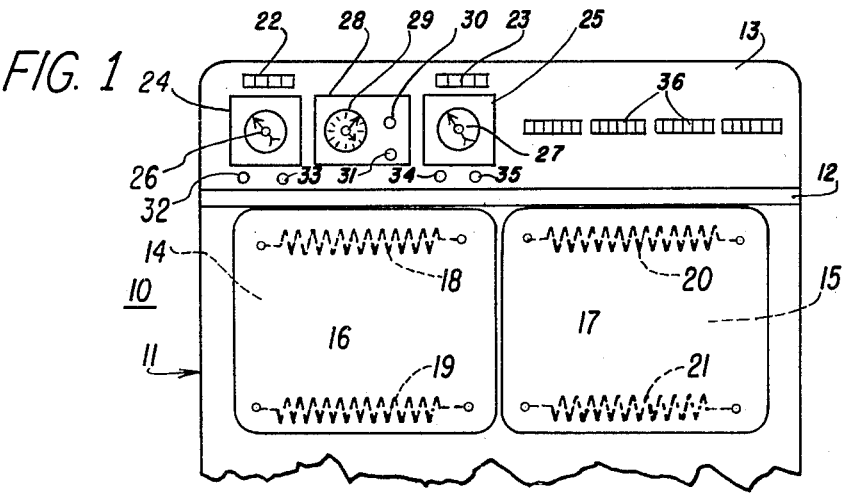
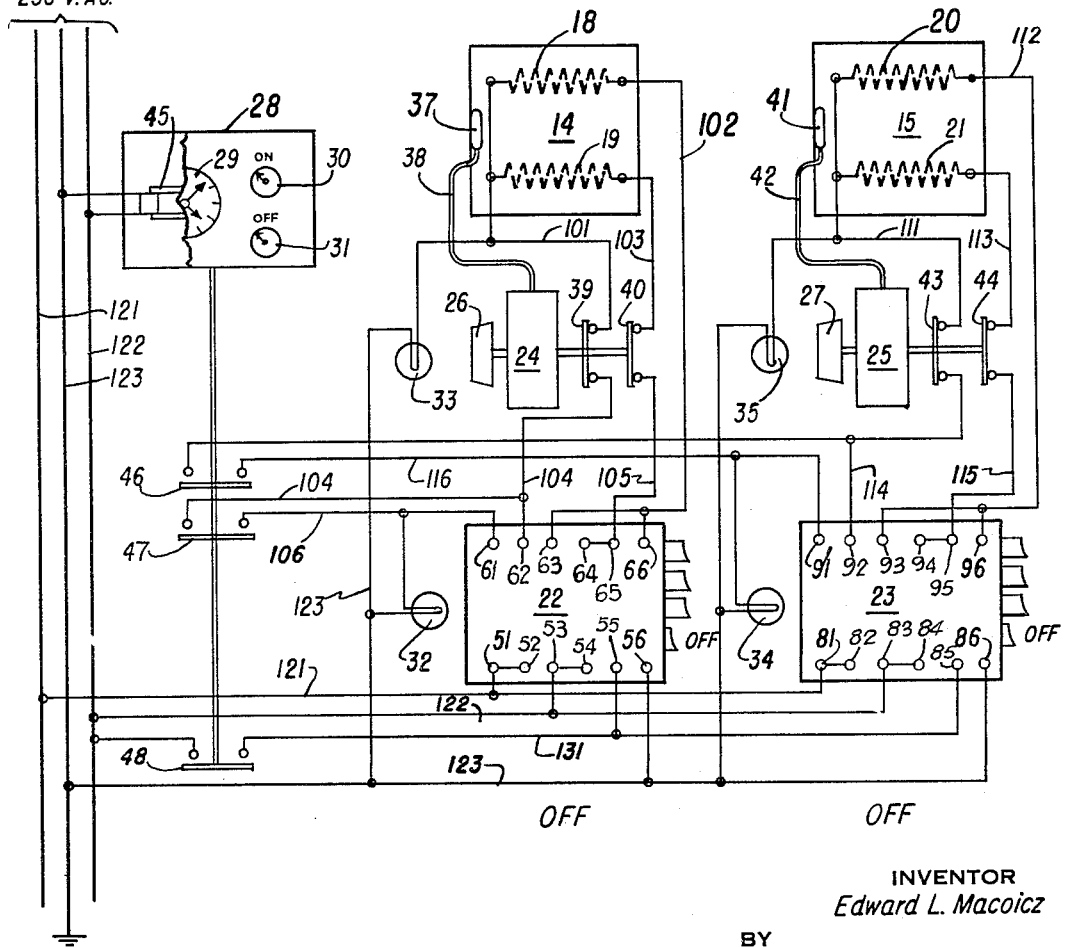
INVENTOR
Edward L. Macoicz
BY
Smith, Olsen, Baird & Gulbrandsen
Attys.

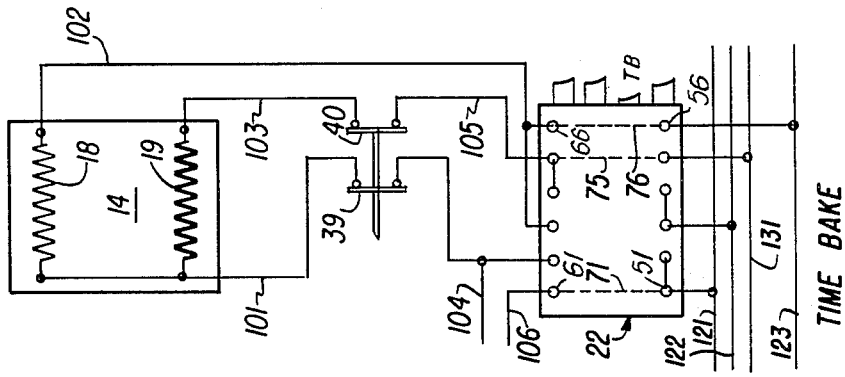
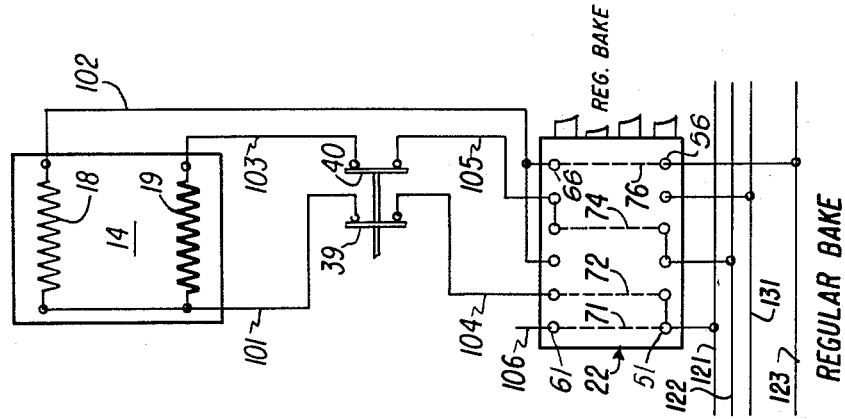
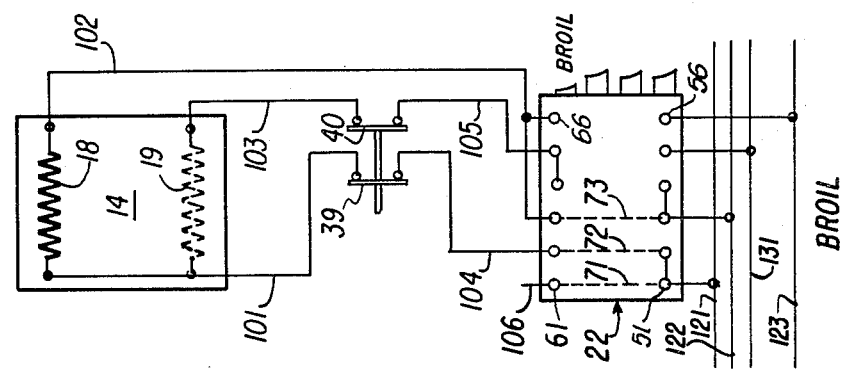
INVENTOR
Edward L. Macoicz

United States Patent Office 2,742,557
Patented Apr. 17, 1956

2,742,557

CONTROLS FOR ELECTRIC OVENS

Edward L. Macoicz, Chicago, Ill., assignor to General Electric Company, a corporation of New York Application September 28, 1953, Serial No. 382,693

10 Claims. (Cl. 219—20)

The present invention relates to controls for electric ovens, and more particularly to improved controls for electric broiling and baking ovens of the general character disclosed in U. S. Patent No. 2,515,427, granted on July 18, 1950, to Herman W. Schulze.

In the Schulze patent, there is disclosed an electric range comprising a broiling and baking oven provided with first and second heating elements disposed adjacent to the top of the oven cavity and a third heating element disposed adjacent to the bottom of the oven cavity, as well as a unitary control switch of the rotary type having off, broil, regular brake and time bake positions. Also the range comprises a three-wire Edison source of current supply, a manually settable thermostatic switch responsive to the temperature in the oven cavity, and a manually settable timer switch.

In this range, the control switch is operative into its broil position to connect the first and second heating elements in parallel across the outside lines of the Edison source and to open the circuit to the third heating element; and the control switch is operative into its regular bake and time bake positions to connect the second and third heating elements in parallel across the outside lines of the Edison source and to open the circuit to the first heating element. Also in the time bake position of the control switch, the timer switch is included in series with the connection mentioned between one of the outside lines of the Edison source and the associated terminals of the second and third heating elements; and in the regular bake position of the control switch, the timer switch is excluded from the last-mentioned connection. Finally the thermostatic switch is included in series with both of the outside lines of the Edison source.

While the control circuit arrangement for the oven of this range is entirely satisfactory in operation and very economical to manufacture, it is not altogether safe from the standpoint of electrical shock hazard to the cook when the control switch occupies its time bake position and the timer switch occupies its open position and when heating elements of the open resistance coil type are employed. More particularly open resistance coil heating elements, as distinguished from sheathed resistance conductor heating elements, are frequently employed in the oven cavity, these heating elements being suitably supported by and insulated from removable frames or racks respectively supported adjacent to the top of the oven cavity and adjacent to the bottom of the oven cavity in the general manner disclosed in U. S. Patent No. 2,498,583, granted on February 21, 1950, to Herman W. Schulze. More specifically, under the particular circumstances noted, the heating elements are not thermally hot since the timer switch occupies its open position, but one of the outside lines of the Edison source is connected to a terminal of each of the heating elements, whereby the outside line-neutral line voltage of the Edison source is impressed between each of the heating elements and the grounded metal oven liner and the grounded metal body of the range. While the cook is not apt to touch the lower heating element, since it is ordinarily covered by an associated heat deflecting baffle, she might touch either one of the upper heating elements, since the associated heat deflecting baffle is ordinarily disposed thereabove. More specifically, the cook might touch one of the upper heating elements incident to placing a roasting pan, or the like, in the oven cavity while she is also in contact with the oven cavity liner or the body of the range, resulting in an electrical shock, or even an electrical burn should her contacts with the parts noted be sufficiently good.

In this range, the other positions of the control switch do not present the electrical shock hazard noted as the various heating elements become thermally hot such a short time interval after the control switch is operated into its broil position or into its regular bake position and since the cook is not apt to touch a thermally hot heating element.

Accordingly, it is the general object of the present invention to provide a control for an electric oven that reduces to a minimum shock hazard to the cook in carrying out the various broiling and baking operations in the oven when open resistance coil type heating elements are employed therein.

Another object of the invention is to provide in an electric oven provided with a baking heater of the open resistance coil type, an improved circuit network that includes a manual control switch that may be selectively set into time bake and regular bake positions so as respectively to include and to exclude an associate manually settable timer switch, wherein the touching of one of the baking heaters while the control switch occupies its time bake position and the timer switch occupies its open position presents no electrical shock hazard to the cook.

Another object of the invention is to provide in an electric baking oven provided with heating elements, a circuit network that includes a manual control switch for selectively connecting the heating elements in different circuit arrangements to obtain the different heating conditions in the oven cavity, wherein the circuit network also embodies an improved arrangement of a manually settable timer switch, and a thermostatic switch that is responsive to the temperature of the oven cavity, as well as an arrangement of a control switch pilot lamp responsive to operation of the control switch out of its off position, and a thermostatic switch pilot lamp responsive to operation of the thermostatic switch into its closed position.

A further object of the invention is to provide in an electric broiling and baking oven including two heating elements respectively disposed adjacent to the top of the oven cavity and adjacent to the bottom of the oven cavity, an improved circuit network that is selectively operative to energize the top heating element at a high voltage for broiling purposes and simultaneously to energize the top heating element at a low voltage and the bottom heating element at a high voltage for baking purposes, wherein the circuit network includes a manually operable control switch having corresponding off and broil and regular bake and time bake positions, a thermostatic switch for selectively controlling the energization of the heating elements mentioned when the control switch occupies either its regular bake position or its time bake position, and a timer switch for selectively controlling upon a clock-time basis the energization of the heating elements mentioned when the control switch occupies its time bake position.

A still further object of the invention is to provide in an electric range of the double-oven type, an improved circuit network including two thermostatic switches respectively associated with the two oven cavities for respectively controlling the regular baking and the time baking operations in the corresponding oven cavities upon a temperature basis, and a single timer switch commonly associated with the two ovens for selectively controlling upon a clock-time basis the time baking operation in either or both of the two ovens dependent upon the selective operations of the corresponding control switches into their respective time bake positions.

Further features of the invention pertain to the particular arrangement of the elements of the circuit control network, whereby the above-outlined and additional operating features thereof are attained.

The invention, both as to its organization and method of operation, together with further objects and advantages thereof, will best be understood by reference to the following specification taken in connection with the accompanying drawings, in which:

Figure 1 is a fragmentary front view of the upper portion of an electric range provided with two ovens each incorporating a broiling and baking control network and embodying the present invention;

Fig. 2 is a diagram of the circuit control network incorporated in the range shown in Fig. 1, all of the switches and circuit controls being illustrated in their normal or off positions;

Fig. 3 is a fragmentary portion of the diagram shown in Fig. 2, illustrating the circuit connections for the left-hand oven when the individually associated manual control switch occupies its broil position;

Fig. 4 is another fragmentary portion of the diagram shown in Fig. 2, illustrating the circuit connections for the left-hand oven when the individually associated manual control switch occupies its regular bake position; and Fig. 5 is a further fragmentary portion of the diagram shown in Fig. 2, illustrating the circuit connections for the left-hand oven when the individually associated manual control switch occupies its time bake position.

In the diagram of the heating elements appearing in Figs. 2 to 5, inclusive, a broken line indicates that the corresponding heating element is deenergized; a heavy solid line indicates that the corresponding heating element is energized at high voltage producing a high wattage; and a light solid line indicates that the corresponding heating element is energized at low voltage producing a low wattage.

Referring now to Fig. 1 of the drawings, the electric range 10 there illustrated and incorporating the broiling and baking oven controls embodying the features of the present invention comprises an upstanding metal body 11 that is provided with a cooking top 12 terminating at the rear thereof in an upwardly directed backsplash 13. Broiling and baking oven cavities 14 and 15 are respectively defined in the upper left-hand portion and in the upper right-hand portion of the body 11 by corresponding metal oven liners, not shown; which oven cavities 14 and 15 are respectively provided with doors 16 and 17 that are hinged adjacent to the lower edges thereof and movable between open and closed positions. In the upper portion of the cavity 14, a first removable frame, not shown, is provided that supports a first electric heating element 18 in a substantially horizontal position; and in the lower portion of the oven cavity 14, a second removable frame, not shown, is provided that suports a second electric heating element 19 in a substantially horizontal position. Similarly, in the upper portion of the oven cavity 15, a third removable frame, not shown, is provided that supports a third electric heating element 20 in a substantially horizontal position; and in the lower portion of the oven cavity 15, a fourth removable frame, not shown, is provided that supports a fourth electric heating element 21 in a substantially horizontal position. Preferably the heating elements 18, 19, 20 and 21 are of the open resistance coil type and are arranged upon the respective upper and lower frames in the general manner disclosed in the previously-mentioned Schulze Patent No. 2,498,583, it being understood that the electric heating elements are suitably electrically insulated from the associated supporting frames.

The circuit network that is provided for the purpose of selectively controlling the electric heating elements 18 and 19 comprises a manual control switch 22 mounted upon the left-hand upper portion of the backsplash 13; and the circuit network that is provided for the purpose of selectively controlling the electric heating elements 20 and 21 comprises a manual control switch 23 mounted upon the central upper portion of the backsplash 13. Preferably, the control switches 22 and 23 are of the pushbutton type and of the general construction disclosed in U. S. Patent No. 2,431,904, granted on December 2, 1947, to John L. Andrews; and specifically each of the control switches 22 and 23 includes four individual manually operable pushbuttons respectively corresponding to the off, broil, regular bake and time bake positions thereof. In passing, it is noted that each of the control switches 22 and 23 is so constructed and arranged that as any one of its pushbuttons is manually actuated into its in position, the last actuated one of its pushbuttons is returned to its out position, and the control switch is set into its control position corresponding to the presently actuated one of its pushbuttons. Also the backsplash 13 carries two thermostatic switches 24 and 25 that are respectively associated with the control switches 22 and 23 and that are respectively arranged to control the corresponding heating elements 18—19, and 20—21 in the corresponding oven cavities 14 and 15. The thermostatic switches 24 and 25 are respectively provided with manually operable control dials 26 and 27 that are employed for the purpose of selectively setting the corresponding temperatures that are maintained in the corresponding oven cavities 14 and 15, as explained more fully hereinafter. Further, the backsplash 13 carries a timer switch 28 disposed between the thermostatic switches 24 and 25 and commonly associated with the oven cavities 14 and 15 and adapted simultaneously to control the heating elements 18—19 and 20—21 in the respective oven cavities 14 and 15 when the respective control switches 22 and 23 occupy their respective time bake positions. The timer switch 28 is provided with a clock face 29, a manually settable on knob 30 and a manually settable off knob 31. Further, the backsplash 13 carries a pilot lamp 32 individual to the control switch 22, a pilot lamp 33 individual to the thermostatic switch 24, a pilot lamp 34 individual to the control switch 23, a pilot lamp 35 individual to the thermostatic switch 25, and a number of pushbutton switches 36 for controlling the surface units, not shown, that are also carried by the cooking top 12.

Referring now more particularly to Fig. 2, it is pointed out that the thermostatic switch 24 further comprises a thermal responsive element 37 arranged within the oven cavity 14 and responsive to the temperature therein, as well as a connecting capillary tube 38, and a pair of contact bridging members 39 and 40; it being understood that the thermostatic switch 24 may be selectively set to maintain any predetermined desired temperature within the oven cavity 14 by proper manipulation of the control dial 26. Similarly, the thermostatic switch 25 further comprises a thermal responsive element 41 arranged within the oven cavity 15 and responsive to the temperature therein, as well as a connecting capillary tube 42, and a pair of contact bridging members 43 and 44; it being understood that the thermostatic switch 25 may be selectively set to maintain any predetermined temperature within the oven cavity 15 by proper manipulation of the control dial 27.

More particularly, the thermostatic switches 24 and 25 normally maintain closed the contact pairs respectively associated with the bridging members 39—40 and 43—44, the thermostatic switch 24 being operative to open the contact bridging members 39 and 40 in response to an influence from the element 37 indicating that the temperature within the oven cavity 14 has reached the temperature previously set by the control dial 26, and the thermostatic switch 25 being operative to open the contact bridging members 43 and 44 in response to an influence from the element 41 indicating that the temperature within the oven cavity 15 has reached the temperature previously set by the control dial 27.

Preferably, the timer switch 28 is of the general construction of that disclosed in U. S. Patent No. 1,522,988, granted on January 13, 1925, to Henry E. Warren, and comprises a synchronous electric motor 45 of the "Telechron" type, as well as three contact bridging members 46, 47 and 48 that normally occupy open positions with respect to the associated pairs of contacts, and that are later operated into closed positions with respect to the associated pairs of contacts at a first preset clock-time governed by the on control knob 30, and that are still later operated back into their open positions with respect to the associated pairs of contacts at a second preset clock-time governed by the off control knob 31. For example, in the timer switch 28, the on control knob 30 may be set to a first predetermined clock-time, such, for example, as 5:00 o'clock, and the off control knob 31 may be set to a second predetermined clock-time, such, for example, as 6:00 o'clock; whereby the timer switch 28 effects the selective controls noted of the bridging members 46, 47 and 48 at the two previously set clock-times so that a baking operation is carried out in one or the other or both of the oven cavities 14 and 15 from 5:00 o'clock to 6:00 o'clock depending upon the positions of the respective control switches 22 and 23.

The manual control switch 22 of the pushbutton type further comprises six incoming terminals 51 to 56, inclusive, five outgoing terminals 61 to 66, inclusive, and six individual switch blades 71 to 76, inclusive; and likewise, the manual control switch 23 of the push-button type further comprises six incoming terminals 81 to 86, inclusive, six outgoing terminals 91 to 96, inclusive, and six individual switch blades, not shown. In each of the control switches 22 and 23, the individual switch blades 71, etc., are adapted to complete connections between the corresponding incoming terminals 51, etc., and the corresponding outgoing terminals 61, etc., in the different positions of the control switches, as explained more fully hereinafter. Also in the control switch 22, the incoming terminals 51 and 52 are permanently strapped, the incoming terminals 52 and 53 are permanently strapped, and the outgoing terminals 64 and 65 are permanently strapped; and likewise, in the control switch 23 the incoming terminals 81 and 82 are permanently strapped, the incoming terminals 83 and 84 are permanently strapped, and the outgoing terminals 94 and 95 are permanently strapped.

Further, the circuit network comprises a bus 101 commonly connecting together the inside terminals of the heating elements 18 and 19 and terminated by one of the contacts controlled by the bridging member 39, a bus 102 connected to the outside terminal of the heating element 18 and commonly terminated by the outgoing terminals 63 and 66, a bus 103 connected to the outside terminal of the heating element 19 and terminated by one of the contacts controlled by the bridging member 40, a bus 104 connected between the other contact controlled by the bridging member 39 and the outgoing terminal 62, a bus 105 connected between the other contact controlled by the bridging member 40 and the outgoing terminal 65, a bus 106 terminated by the outgoing terminal 61, a bus 111 commonly connecting together the inside terminals of the heating elements 20 and 21 and terminated by one of the contacts controlled by the bridging member 43, a bus 112 connected to the outside terminal of the heating element 20 and commonly terminated by the outgoing terminals 93 and 96, a bus 113 connected to the outside terminal of the heating element 21 and terminated by one of the contacts controlled by the bridging member 44, a bus 114 connected between the other contact controlled by the bridging member 43 and the outgoing terminal 92, a bus 115 connected between the other contact controlled by the bridging member 44 and the outgoing terminal 95, and a bus 116 terminated by the outgoing terminal 91, as well as a three-wire Edison source of current supply of 236 volts, single-phase A. C., that includes first and second outside lines 121 and 122 and a grounded neutral line 123. The outside line 121 is commonly connected to the incoming terminals 51 and 81; the outside line 122 is commonly connected to the incoming terminals 53 and 83; and the neutral line 123 is commonly connected to the incoming terminals 56 and 86. Finally, the circuit network comprises a bus 131 commonly connected to the incoming terminals 55 and 85 and terminated by one of the contacts controlled by the bridging member 48, the other contact controlled by the bridging member 49 being connected to the outside line 122. The winding of the synchronous motor 45 is connected across the outside line 122 and the neutral line 123; the contacts of the pair controlled by the bridging member 46 are respectively connected to the busses 114 and 116; while the contacts of the pair controlled by the bridging member 47 are respectively connected to the busses 104 and 107. The pilot lamp 32 individual to the control switch 22 is connected between the bus 106 and the neutral line 123; the pilot lamp 34 individual to the control switch 23 is connected between the bus 116 and the neutral line 123; the pilot lamp 33 individual to the thermostatic switch 24 is connected between the bus 101 and the neutral line 123; and the pilot lamp 35 individual to the thermostatic switch 25 is connected between the bus 111 and the neutral line 123.

Considering now the operation of the circuit network of Figs. 2 to 5, inclusive, in conjunction with the control of the heating elements 18 and 19 provided in the oven cavity 14 and the heating elements 20 and 21 provided in the oven cavity 15, it is first noted that when the off pushbutton of the control switch 22 is actuated, the six incoming terminals 51 to 56, inclusive, are respectively disconnected from the six outgoing terminals 61 to 66, inclusive, as indicated in Fig. 2, and similarly, when the off pushbutton of the control switch 23 is actuated, the six incoming terminals 81 to 86, inclusive, are respectively disconnected from the six outgoing terminals 91 to 96, inclusive, as indicated in Fig. 2. Accordingly, at this time, the heating elements 18 and 19 individually associated with the oven cavity 14 and the heating elements 20 and 21 individually associated with the oven cavity 15 are deenergized as shown in broken lines in Fig. 2. Also, at this time, it may be assumed that the oven cavity 14 is cool so that the thermostatic switch 24 operates the bridging members 39 and 40 to close the associated pairs of contacts; and likewise, it may be assumed that the oven cavity 15 is cool so that the thermostatic switch 25 operates the bridging members 43 and 44 to close the associated pairs of contacts. Further, it may be assumed that the timer switch 28 is operating for clock purposes, but that neither of the control knobs 30 or 31 is set. Accordingly, at this time, all of the pilot lamps 32, 33, 34 and 35 are extinguished.

Now assuming that the cook wishes to perform a broiling operation in the oven cavity 14, she merely operates the broil pushbutton of the control switch 22 setting the circuit elements into the condition shown in Fig. 3; whereby the incoming terminals 51, 52 and 53 are respectively connected to the outgoing terminals 61, 62 and 63 by the respective switch blades 71, 72 and 73. When the control switch 22 is thus operated into its broil position, the top heating element 18 is energized across the outside lines 121 and 122 via a circuit including the busses 104, 101 and 102, as well as the bridging member 39. Accordingly, the top heating element 18 develops its full rated wattage of approximately 3200 watts, all of the heat being developed in the upper portion of the oven cavity 14, which is desirable for broiling purposes.

Normally when a broiling operation is to be carried out in the oven cavity 14, the control dial 26 of the thermostatic switch 24 is set up to its maximum temperature position and the door 16 is set ajar or cracked to ventilate the oven cavity 14; whereby the thermostatic switch 24 ordinarily exercises no control during the broiling operation. Also at this time, the thermostatic switch pilot lamp 33 is illuminated between the bus 101 and the neutral line 123 in order to indicate that the bridging members 39 and 40 of the thermostatic switch 24 occupy their closed positions with respect to the associated pairs of contacts; and the control switch pilot lamp 32 is illuminated between the bus 106 and the neutral line 123 in order to indicate that the control switch 22 occupies other than its off position.

Now assuming that the cook wishes to perform a regular baking operation in the oven cavity 14, she first sets the control dial 26 to the temperature that is desirable in the oven cavity 14, and merely operates the regular back pushbutton of the control switch 22 setting the circuit elements into the condition shown in Fig. 4; whereby the incoming terminals 51, 52, 54 and 56 are respectively connected to the outgoing terminals 61, 62, 64 and 66 by the respective switch blades 71, 72, 74 and 76. When the control switch 22 is thus operated into its regular bake position, the top heating element 18 is energized across the outside line 121 and the neutral line 123 via a circuit including the busses 104, 101 and 102, as well as the contact bridging member 39; and the bottom heating element 19 is energized across the outside lines 121 and 122 via a circuit including the busses 104, 101, 103 and 105, as well as the contact bridging members 39 and 40. Accordingly, the top heating element 18 develops a wattage of only approximately 800 watts; while the bottom heating element 19 develops its full rated wattage of approximately 2000 watts. Thus in the regular bake position of the control switch 22, the total wattage developed in the oven cavity 14 is approximately 2800 watts; however, substantially 2000 watts of this total wattage is developed by the bottom heating element 19 so that a disproportionate amount of heat is produced in the lower portion of the oven cavity 14, which is necessary in order that a substantially uniform distribution of the heat be effected throughout the oven cavity 14, which is desirable for regular baking purposes.

During the carrying out of the regular baking operation in the oven cavity 14 when the temperature therein reaches that previously set by the control dial 26, the temperature responsive element 37 is suitably influenced in order to govern the thermostatic switch 24 so that the bridging members 39 and 40 are operated to open the circuits for energizing the heating elements 18 and 19. The temperature within the oven cavity 14 than subsides, and when it reaches a temperature slightly below that previously set by the control dial 26, the temperature responsive element 37 is suitably influenced in order to govern the thermostatic switch 24 so that the bridging members 39 and 40 are again operated to close the circuits for energizing the heating elements 18 and 19. As the regular baking operation is continued, the thermostatic switch 24 operates in the manner described above to hold the previously set temperature in the oven cavity 14. During the regular baking operation, the thermostatic switch pilot lamp 33 is illuminated only when the bridging members 39 and 40 of the thermostatic switch 24 occupy their closed positions with respect to the associated pairs of contacts producing a corresponding indication; and the control switch pilot lamp 32 is illuminated in order to indicate that the control switch 22 occupies other than its off position.

Finally, assuming that the cook wishes to perform a time baking operation in the oven cavity 14, she first sets the control dial 26 to the temperature that is desired in the oven cavity 14, and then sets the time during which the time baking operation is desired upon the timer switch 28. Specifically, the on control knob 30 is set at the clock-time it is wished to initiate the baking operation, such, for example, at 5:00 o'clock; and the off control knob 31 is set to the clock-time at which it is wished to arrest the baking operation, such, for example, as 6:00 o'clock. Then the cook operates the time bake pushbutton of the control switch 22 setting the circuit element into the condition shown in Fig. 5; whereby the incoming terminals 51, 55 and 56 are respectively connected to the outgoing terminals 61, 65 and 66 by the respective switch blades 71, 75 and 76. When the control switch 22 is thus operated into its time bake position, a circuit is prepared for energizing the top heating element 18 across the outside line 121 and the neutral line 123; which circuit is open at this time at the contact bridging member 47 of the timer switch 28; and a circuit is prepared for energizing the bottom heating element 19 across the outside lines 121 and 122; which circuit is open at this time at the contact bridging members 47 and 48 of the timer switch 28. Thus at this time, when the timer switch 28 occupies its open position, there is no potential upon the heating elements 18 and 19; and accordingly, there is no shock hazard to the cook should she inadvertently touch either one of the heating elements 18 or 19 while she is also in contact with the metal liner of the oven cavity 14 or the metal body 11 of the range 10. This consideration is of fundamental importance with respect to the top heating element 18 that is exposed directly in the top of the oven cavity 14, since the heat distributing shield or baffle normally associated with bottom heating element 19 in the bottom of the oven cavity 14 prevents contact by the cook with the lower heating element 19. However, the voltages are removed from both of the heating elements 18 and 19; whereby shock hazard is prevented, as described above.

Continuing now with the time baking operations, when the clock 29 of the timer switch 28 reaches the 5:00 o'clock position set by the on control knob 30, the bridging members 46, 47 and 48 are operated into their closed positions with respect to the associated pairs of contacts. This operation of the bridging members 47 and 48 completes the circuits for energizing the heating elements 18 and 19 in the oven cavity; while this operation of the bridging members 46 and 48 prepares similar circuits for energizing the heating elements 20 and 21 in the oven cavity 15. However, in the present instance, it will be assumed that the circuits for energizing the heating elements 20 and 21 in the oven cavity 15 are not completed, as it will be assumed that the corresponding control switch 23 occupies other than its time bake position. The circuit for energizing the top heating element 18 extends from the outside line 121 via the switch blade 71, the bus 106, the contact bridging member 47, the bus 104, the contact bridging member 39, the bus 101, the top heating element 18, the bus 102, and the switch blade 76 to the neutral line 123; while the circuit for energizing the bottom heating element 19 extends from the outside line 121 via the switch blade 71, the bus 106, the contact bridging member 47, the bus 104, the contact bridging member 39, the bus 101, the bottom heating element 19, the bus 103, the contact bridging member 40, the bus 105, the switch blade 75, the bus 131 and the contact bridging member 48 to the outside line 122. Accordingly, at this time, the heating elements 18 and 19 respectively develop the wattages of approximately 800 watts and approximately 2000 watts previously mentioned in conjunction with the regular baking operation.

The time baking operation proceeds in a manner identical to that of the regular baking operation previously described under the control of the thermostatic switch 24 and until the clock 29 reaches the 6:00 o'clock position set by the off control knob 31; whereupon the contact bridging members 46, 47 and 48 are operated back into their normal open positions with respect to the associated pairs of contacts, thereby interrupting the previously traced circuits for energizing the heating elements 18 and 19. Again, it will be observed that when the contact bridging members 47 and 48 of the timer switch 28 are returned into their open positions with respect to the associated pairs of contacts, all potentials are removed from the heating elements 18 and 19 in order again to eliminate any shock hazard to the cook should she inadvertently touch any one of the heating elements noted while she is also in contact with the metal liner of the oven cavity 14. At this time the time baking operation has been completed.

In the time baking operations the control of the thermostatic switch pilot lamp 33 and the control of the control swich pilot lamp 32 are the same as described in conjunction with the regular baking operation.

In carrying out the broiling, regular baking and time baking operations in the oven cavity 15 under the control of the control switch 23, the thermostatic switch 25 and the timer switch 28 are substantially identical to those described above in conjunction with the oven cavity 14. In this case, the thermostatic switch 25 holds the temperature in the oven cavity 15 that is set by the control dial 27, in the regular baking and time baking operations; and in the time baking operation, the timer switch 28 controls the circuits for energizing the heating elements 20 and 21 in the oven cavity 15 at the contact bridging members 46 and 48. Accordingly, it will be understood that in the oven cavities 14 and 15 broiling and regular baking operations may be carried out entirely independently of each other; whereas in the carrying out of time baking operations therein, the timer switch 28 exercises a common time control, although the thermostatic switches 24 and 25 exercise independent controls. Thus time baking operations may be simultaneously carried out in the respective cavities 14 and 15 at respectively set temperatures, but the time interval during which the time baking operations are carried out is commonly controlled by the timer switch 28. This arrangement is very advantageous as it is frequently desirable to carry out simultaneously between predetermined clock-times time baking operations at different temperatures.

In view of the foregoing, it is apparent that there has been provided in an electric range of the double-oven type, an improved control circuit for selectively carrying out the various broiling and baking operations in the oven cavities, that is efficient in operation, simple in action, and safe in use.

While there has been described what is at present considered to be the preferred embodiment of the invention, it will be understood that various modifications may be made therein, and it is intended to cover in the appended claims all such modifications as fall within the spirit and scope of the invention.

What is claimed is:

1. An electric broiling and baking oven comprising a single top electric heating element disposed adjacent to the top of said oven, a single bottom electric heating element disposed adjacent to the bottom of said oven, a three-wire Edison electric current supply source provided with first and second outside lines and a neutral line, a first circuit for connecting said top heating element across said first and second outside lines, a second circuit for connecting said top heating element across said first outside line and said neutral line, a third circuit for connecting said bottom heating element across said first and second outside lines, a unitary control switch having broil and regular bake and time bake positions, said control switch being operative into its broil position to complete said first circuit, said control switch being operative into its regular bake position to complete said second and third circuits, said control switch being operative into its time bake position to prepare said second and third circuits, a timer switch selectively settable to desired on and off clock times and operative respectively to close and to open both said prepared second and third circuits at said respectively set on and off clock times when said control switch occupies its time bake position, the wattage developed by said top heating element in said first circuit being greater than the wattage developed by said bottom heating element in said third circuit and the wattage developed by said bottom heating element in said third circuit being considerably greater than the wattage developed by said top heating element in said second circuit, and a thermostatic switch associated with said oven and responsive to the temperature therein, said thermostatic switch being selectively operative to open and to close both said second and third circuits when said control switch occupies either its regular bake position or its time bake position.

2. The electric broiling and baking oven set forth in claim 1, wherein said timer switch in its operation to open said second and third circuits clears said top and bottom heating elements of voltages thereon to eliminate shock hazard.

3. An electric broiling and baking oven comprising a single top electric heating element disposed adjacent to the top of said oven, a single bottom electric heating element disposed adjacent to the bottom of said oven, a three-wire Edison electric current supply source provided with first and second outside lines and a neutral line, a first circuit for connecting said top heating element across said first and second outside lines, a second circuit for connecting said top heating element across said first outside line and said neutral line, a third circuit for connecting said bottom heating element across said first and second outside lines, a unitary control switch having off and broil and bake positions, said control switch being operative into its broil position to complete said first circuit, said control switch being operative into its bake position to complete said second and third circuits, the wattage developed by said top heating element in said first circuit being greater than the wattage developed by said bottom heating element in said third circuit and the wattage developed by said bottom heating element in said third circuit being considerably greater than the wattage developed by said top heating element in said second circuit, a thermostatic switch associated with said oven and responsive to the temperature therein, said thermostatic switch being selectively operative to open and to close both said second and third circuits when said control switch occupies its bake position, a first pilot lamp, means responsive to operation of said control switch into either its broil position or its bake position for illuminating said first pilot lamp and responsive to operation of said control switch into its off position for extinguishing said first pilot lamp, a second pilot lamp, and means responsive to operation of said thermostatic switch to close said second and third circuits for illuminating said second pilot lamp and responsive to operation of said thermostatic switch to open said second and third circuits for extinguishing said second pilot lamp.

4. The electric broiling and baking oven set forth in claim 1, wherein said control switch is of the manually operable pushbutton type.

5. An electric broiling and baking oven comprising a single top electric heating element disposed adjacent to the top of said oven, a single bottom electric heating element disposed adjacent to the bottom of said oven, a three-wire Edison electric current supply source provided with first and second outside lines and a neutral line, a first path for connecting said first heating element across said first and second outside lines, second and third multiple paths for connecting said first heating element across said first outside line and said neutral line, fourth and fifth multiple paths for connecting said second heating element across said first and second outside lines, a unitary control switch having broil and regular bake and time bake positions, said control switch being operative into its broil position to complete said first path, said control switch being operative into its regular bake position to complete said second and fourth paths, said control switch being operative into its time bake position to prepare said third and fifth paths, a timer switch selectively settable to desired on and off clock times and operative respectively to close and to open a first point common to said third and fifth paths and a second point in said fifth path at said respectively set on and off clock times, and a thermostatic switch associated with said oven and responsive to the temperature therein, said thermostatic switch being selectively operative to open and to close a third point common to said second and fourth paths and a fourth point in said fourth path.

6. An electric baking oven comprising a single top electric heating element disposed adjacent to the top of said oven, a single bottom electric heating element disposed adjacent to the bottom of said oven, a three-wire Edison electric current supply source provided with first and second outside lines and a neutral line, first and second multiple paths for connecting said first heating element across said first outside line and said neutral line, third and fourth multiple paths for connecting said second heating element across said first and second outside lines, a unitary control switch having regular bake and time bake positions, said control switch being operative into its regular bake position to complete said first and third paths, said control switch being operative into its time bake position to prepare said second and fourth paths, a timer switch selectively settable to desired on and off clock times and operative respectively to close and to open a first point common to said second and fourth paths and a second point in said fourth path at said respectively set on and off clock times, and a thermostatic switch associated with said oven and responsive to the temperature therein, said thermostatic switch being selectively operative to open and to close a third point common to said first and third paths and a fourth point in said fourth path.

7. An electric range comprising first and second ovens, a single first top electric heating element disposed adjacent to the top of said first oven, a single first bottom electric heating element disposed adjacent to the bottom of said first oven, a single second top electric heating element disposed adjacent to the top of said second oven, a single second bottom electric heating element disposed adjacent to the bottom of said second oven, a three-wire Edison electric current supply source provided with first and second outside lines and a neutral line, a first circuit for connecting said first top heating element across said first and second outside lines, a second circuit for connecting said first top heating element across said first outside line and said neutral line, a third circuit for connecting said first bottom heating element across said first and second outside lines, a fourth circuit for connecting said second top heating element across said first and second outside lines, a fifth circuit for connecting said second top heating element across said first outside line and said neutral line, a sixth circuit for connecting said second bottom heating element across said first and second outside lines, first and second unitary control switches respectively corresponding to said first and second ovens and each having broil and regular bake and time bake positions, said first control switch being operative into its broil position to complete said first circuit, said first control switch being operative into its regular bake position to complete said second and third circuits, said first control switch being operative into its time bake position to prepare said second and third circuits, said second control switch being operative into its broil position to complete said fourth circuit, said second control switch being operative into its regular bake position to complete said fifth and sixth circuits, said second control switch being operative into its time bake position to prepare said fifth and sixth circuits, a timer switch commonly associated with said first and second ovens and selectively settable to desired on and off clock times and operative respectively to close and to open both said prepared second and third circuits at said respectively set on and off clock times when said first control switch occupies its time bake position and operative respectively to close and to open both said prepared fifth and sixth circuits at said respectively set on and off clock times when said second control switch occupies its time bake position, and first and second thermostatic switches associated respectively with said first and second ovens and responsive respectively to the temperatures therein, said first thermostatic switch being selectively operative to open and to close both said second and third circuits when said first control switch occupies either its regular bake position or its time bake position, said second thermostatic switch being selectively operative to open and to close both said fifth and sixth circuits when said second control switch occupies either its regular bake position or its time bake position.

8. An electric range comprising first and second ovens, a single first top electric heating element disposed adjacent to the top of said first oven, a single first bottom electric heating element disposed adjacent to the bottom of said first oven, a single second top electric heating element disposed adjacent to the top of said second oven, a single second bottom electric heating element disposed adjacent to the bottom of said second oven, a three-wire Edison electric current supply source provided with first and second outside lines and a neutral line, a first path for connecting said first top heating element across said first and second outside lines, second and third multiple paths for connecting said first top heating element across said first outside line and said neutral line, fourth and fifth multiple paths for connecting said first bottom heating element across said first and second outside lines, a sixth path for connecting said second top heating element across said first and second outside lines, seventh and eighth multiple paths for connecting said second top heating element across said first outside line and said neutral line, ninth and tenth multiple paths for connecting said second bottom heating element across said first and second outside lines, first and second unitary control switches respectively corresponding to said first and second ovens and each having broil and regular bake and time bake positions, said first control switch being operative into its broil position to complete said first path, said first control switch being operative into its regular bake position to complete said second and fourth paths, said first control switch being operative into its time bake position to prepare said third and fifth paths, said second control switch being operative into its broil position to complete said sixth path, said second control switch being operative into its regular bake position to complete said seventh and ninth paths, said second control switch being operative into its time bake position prepare said eighth and tenth paths, a timer switch commonly associated with said first and second ovens and selectively settable to desired on and off clock times and operative respectively to close and to open a first point common to said eighth and tenth paths and a second point common to said third and fifth paths and a third point common to said fifth and tenth paths at said respectively set on and off clock times, and first and second thermostatic switches associated respectively with said first and second ovens and responsive respectively to the temperatures therein, said first thermostatic switch being selectively operative to open and to close a fourth point common to said second and fourth paths and a fifth point in said fourth path, said second thermostatic switch being selectively operative to open and to close a sixth point common to said seventh and ninth paths and a seventh point in said ninth path.

9. An electric range comprising first and second ovens, a single first top electric heating element disposed adjacent to the top of said first oven, a single first bottom electric heating element disposed adjacent to the bottom of said first oven, a single second top electric heating element disposed adjacent to the top of said second oven, a single second bottom electric heating element disposed adjacent to the bottom of said second oven, a three-wire Edison electric current supply source provided with first and second outside lines and a neutral line, a first circuit for connecting said first top heating element across said first outside line and said neutral line, a second circuit for connecting said first bottom heating element across said first and second outside lines, a third circuit for connecting said second top heating element across said first outside line and said neutral line, a fourth circuit for connecting said second bottom heating element across said first and second outside lines, first and second unitary control switches respectively corresponding to said first and second ovens and each having regular bake and time bake positions, said first control switch being operative into its regular bake position to complete said first and second circuits, said first control switch being operative into its time bake position to prepare said first and second circuits, said second control switch being operative into its regular bake position to complete said third and fourth circuits, said second control switch being operative into its time bake position to prepare said third and fourth circuits, a timer switch commonly associated with said first and second ovens and selectively settable to desired on and off clock times and operative respectively to close and to open both said prepared first and second circuits at said respectively set on and off clock times when said first control switch occupies its time bake position and operative respectively to close and to open both said prepared third and fourth circuits at said respectively set on and off clock times when said second control switch occupies its time bake position, and first and second thermostatic switches associated respectively with said first and second ovens and responsive respectively to the temperatures therein, said first thermostatic switch being selectively operative to open and to close both said first and second circuits when said first control switch occupies either its regular bake position or its time bake position, said second thermostatic switch being selectively operative to open and to close both said third and fourth circuits when said second control switch occupies either its regular bake position or its time bake position.

10. An electric range comprising first and second ovens, a single first top electric heating element disposed adjacent to the top of said first oven, a single first bottom electric heating element disposed adjacent to the bottom of said first oven, a single second top electric heating element disposed adjacent to the top of said second oven, a single second bottom electric heating element disposed adjacent to the bottom of said second oven, a three-wire Edison electric current supply source provided with first and second outside lines and a neutral line, first and second multiple paths for connecting said first top heating element across said first outside line and said neutral line, third and fourth multiple paths for connecting said first bottom heating element across said first and second outside lines, fifth and sixth multiple paths for connecting said second top heating element across said first outside line and said neutral line, seventh and eighth multiple paths for connecting said second bottom heating element across said first and second outside lines, first and second unitary control switches respectively corresponding to said first and second ovens and each having regular bake and time bake positions, said first control switch being operative into its regular bake position to complete said first and third paths, said first control switch being operative into its time bake position to prepare said second and fourth paths, said second control switch being operative into its regular bake position to complete said fifth and seventh paths, said second control switch being operative into its time bake position to prepare said sixth and eighth paths, a timer switch commonly associated with said first and second ovens and selectively settable to desired on and off clock times and operative respectively to close and to open a first point common to said sixth and eighth paths and a second point common to said second and fourth paths and a third point common to said fourth and eighth paths at said respectively set on and off clock times, first and second thermostatic switches associated respectively with said first and second ovens and responsive respectively to the temperatures therein, said first thermostatic switch being selectively operative to open and to close a fourth point common to said first and third paths and a fifth point in said third path, said second thermostatic switch being selectively operative to open and to close a sixth point common to said fifth and seventh paths and a seventh point in said seventh path.

References Cited in the file of this patent

UNITED STATES PATENTS

| | | |
|---|---|---|
| 2,203,236 | Randolph et al. | June 4, 1940 |
| 2,295,298 | Sharp | Sept. 8, 1942 |
| 2,409,434 | Jacobs | Oct. 15, 1946 |
| 2,515,427 | Schulze | July 18, 1950 |
| 2,614,199 | Fallon | Oct. 14, 1952 |
| 2,654,824 | Schroeder | Oct. 6, 1953 |
| 2,663,786 | Illian et al. | Dec. 22, 1953 |